United States Patent
Li et al.

(10) Patent No.: US 12,211,521 B2
(45) Date of Patent: Jan. 28, 2025

(54) METHOD, APPARATUS, DEVICE AND MEDIUM FOR VIDEO EDITING

(71) Applicant: Beijing Zitiao Network Technology Co., Ltd., Beijing (CN)

(72) Inventors: Xinwei Li, Beijing (CN); Wenwen Wen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/622,528

(22) Filed: Mar. 29, 2024

(65) Prior Publication Data

US 2024/0331733 A1 Oct. 3, 2024

Related U.S. Application Data

(63) Continuation of application No. PCT/CN2023/136887, filed on Dec. 6, 2023.

(30) Foreign Application Priority Data

Mar. 30, 2023 (CN) .......................... 202310332310.2

(51) Int. Cl.
*G11B 27/031* (2006.01)
*G06F 3/0482* (2013.01)
(Continued)

(52) U.S. Cl.
CPC .......... *G11B 27/031* (2013.01); *G06F 3/0482* (2013.01); *G06F 3/0484* (2013.01); *H04N 23/62* (2023.01)

(58) Field of Classification Search
CPC .... G11B 27/031; G06F 3/0482; G06F 3/0484
See application file for complete search history.

(56) References Cited

U.S. PATENT DOCUMENTS 9,143,542 B1 *   9/2015   Tseytlin .................... A61B 6/00
10,178,365 B1 * 1/2019   Singh ....................... G10H 1/40
(Continued)

FOREIGN PATENT DOCUMENTS

CN    111866434 A    10/2020
CN    111901572 A    11/2020
(Continued)

OTHER PUBLICATIONS

International Patent Application No. PCT/CN2023/136887; Int'l Search Report; dated Feb. 22, 2024; 2 pages.

(Continued)

*Primary Examiner* — Mishawn N. Hunter
(74) *Attorney, Agent, or Firm* — BakerHostetler

(57) ABSTRACT

The present disclosure relates to a method, an apparatus, a device and a medium for video editing. The method including: obtaining a plurality of target videos, the plurality of target videos comprising first videos shot and recorded by different user devices for a same recording task; obtaining an editing template corresponding to the plurality of target videos, the editing template comprising display position information of the plurality of target videos and track information of the plurality of target videos; and showing a video editing interface based on the plurality of target videos and the editing template; wherein the video editing interface comprises a preview playback area and an editing track area, images of the plurality of target videos are respectively presented in a display area in the preview playback area that is indicated by respective display position information of the plurality of target videos.

17 Claims, 4 Drawing Sheets

(51) Int. Cl.
*G06F 3/0484* (2022.01)
*H04N 23/62* (2023.01)

(56) References Cited

U.S. PATENT DOCUMENTS

| | | | |
|---|---|---|---|
| 2008/0247726 A1 | 10/2008 | Lee et al. | |
| 2011/0197132 A1* | 8/2011 | Escoda | H04L 67/75 715/733 |
| 2012/0284176 A1* | 11/2012 | Svendsen | G11B 27/031 715/753 |
| 2013/0129317 A1* | 5/2013 | Moorer | H04N 21/8456 386/241 |
| 2014/0068437 A1* | 3/2014 | Dedapper | H04N 21/4751 715/719 |
| 2014/0186004 A1* | 7/2014 | Hamer | G11B 27/32 386/223 |
| 2016/0049173 A1* | 2/2016 | Anderson | G11B 27/031 386/241 |
| 2017/0142458 A1* | 5/2017 | Watanabe | H04N 21/4302 |
| 2018/0046361 A1* | 2/2018 | Shah | G06F 3/04845 |
| 2022/0180903 A1 | 6/2022 | Chen et al. | |
| 2022/0262405 A1 | 8/2022 | Conlin et al. | |

FOREIGN PATENT DOCUMENTS

| | | |
|---|---|---|
| CN | 113489937 A | 10/2021 |
| CN | 113556482 A | 10/2021 |
| CN | 114374872 A | 4/2022 |
| CN | 115515006 A | 12/2022 |

OTHER PUBLICATIONS

European Patent Application No. 23869276.8; Extended Search Report; dated Dec. 9, 2024; 9 pages.

\* cited by examiner

METHOD, APPARATUS, DEVICE AND MEDIUM FOR VIDEO EDITING

CROSS-REFERENCE

This application is a continuation of International Patent Application No. PCT/CN2023/136887, filed on Dec. 6, 2023, which claims the benefit of Chinese Patent Application No. 202310332310.2 filed on Mar. 30, 2023, both of which are incorporated herein by reference in their entireties.

FIELD

The present disclosure relates to the field of video processing, and more particularly to a method, an apparatus, a device and a medium for video editing.

BACKGROUND

Nowadays, more and more users are no longer satisfied with the conventional way of video creation. Online video co-creation is gradually emerging, such as game simultaneous screen recording, online choir, and live streamer matchmaking, which can all be regarded as online video co-creation. Although online video co-creation does not require a plurality of users to gather at the same place for video shooting, the production cost need for online video co-creation is high and the convenience is poor.

SUMMARY

To solve the above technical problems or at least partially solve the above technical problems, the present disclosure provides a method, an apparatus, a device and a medium for video editing.

Embodiments of the present disclosure provide a method for video editing, the method including: obtaining a plurality of target videos, the plurality of target videos including first videos shot and recorded by different user devices for a same recording task; obtaining an editing template corresponding to the plurality of target videos, the editing template including display position information of the plurality of target videos and track information of the plurality of target videos; and showing a video editing interface based on the plurality of target videos and the editing template; wherein the video editing interface includes a preview playback area and an editing track area, the editing track area includes a plurality of video editing tracks, images of the plurality of target videos are respectively presented in a display area in the preview playback area that is indicated by respective display position information of the plurality of target videos, and each of the plurality of target videos forms a video track segment on one of the plurality of video editing tracks based on the track information, and timeline positions of the video track segments of the plurality of target videos partially or completely overlap.

Optionally, the target video further includes a third video obtained based on a second video, the second video is a video played by the different user devices during a shooting and recording process for the recording task, and the third video is configured to present a playback state of the second video during the shooting and recording process.

Optionally, the different user devices include a target user device; a user interface provided by the target user device for the recording task is presented with a video operation control in a triggerable state; and user interfaces provided by other user devices in the different user devices except the target user device for the recording task are not presented with the video operation control in the triggerable state; and in a case where the video operation control is in the triggerable state, in response to detecting a user triggering operation for the video operation control on the target user device, the playback state of the second video is adjusted based on the user trigger operation.

Optionally, the different user devices include a first user device and a second user device, and the first user device is a device for importing the second video for the recording task; in a case where the recording task is not closed and the first user device does not exit the recording task, the target user device is the first user device; and in a case where the recording task is not closed and the first user device exits the recording task, the target user device is the second user device.

Optionally, the video editing track corresponding to the third video is a main track, and the video editing tracks corresponding to the first videos are picture-in-picture tracks.

Optionally, in a case where the plurality of target videos include only the first videos, a video editing track corresponding to a first video shot by a third user device in the different user device is a main track, and video editing tracks corresponding to the first videos shot by other user devices except the third user device in the plurality of target videos are picture-in-picture tracks; where the third user device is a device that initiates the recording task.

Optionally, in response to receiving an editing request from a fourth user device in the different user devices, a template selection page is shown; wherein the template selection page includes a plurality of video layout effect diagrams, the video layout effect diagrams include a plurality of areas, and each area in the plurality of areas corresponds to a video display position and a video editing track; and in response to detecting a selection operation for a target effect diagram in the plurality of video layout effect diagrams, the editing template corresponding to the plurality of target videos is determined based on an editing template corresponding to the target effect diagram.

Optionally, determining the editing template corresponding to the plurality of target videos based on the editing template corresponding to the target effect diagram includes: showing a layout preview image of the plurality of target videos based on the target effect diagram selected by the target user from the plurality of video layout effect diagrams and the plurality of target videos; and determining the editing template corresponding to the plurality of target video based on an adjustment operation of the target user for a display position of the target video in the layout preview image.

Optionally, the method further includes: before obtaining a plurality of recorded videos, in response to receiving a request for duet from the target user device, creating the recording task and showing a user interface corresponding to the recording task on the target user device; where a video addition control and a user invitation control are displayed in the user interface; in response to detecting that the video addition control is triggered, obtaining video information uploaded by the target user device, and obtaining the second video based on the video information; wherein the video information includes a local video file and/or a network video link; and in response to detecting that the user invitation control is triggered, generating invitation information of the recording task for the target user device to send the invitation information to a specified user device, the invitation information being configured for prompting the specified user device to join the recording task.

Optionally, a first area and a second area are shown on both the user interface of the target user device and the user interfaces of other user devices performing the recording task; wherein the first area is configured to show image screens of the first videos shot and recorded by individual user devices, and the second region is configured to show an image screen of the second video.

Optionally, a start recording control is further displayed on the user interface of the target user device; in a case where the video addition control is not detected to be triggered by the target user device and the user invitation control is not detected to be triggered by the target user device, the start recording control is in a non-triggerable state; wherein the start recording control in the non-triggerable state is not capable of being triggered to record a video; in a case where the video addition control is detected to be triggered by the target user device and/or the user invitation control is detected to be triggered by the target user device, the start recording control is in a triggerable state; wherein the start recording control in the triggerable state is configured to start recording a video when being triggered.

Optionally, obtaining the plurality of recorded videos includes: in response to detecting that the start recording control in the triggerable state is triggered, performing recording based on frame images captured by front-facing cameras of the user devices performing the recording task, to obtain the first videos; in a case where the second video is obtained by the target user device, synchronously playing the second video by the user devices performing the recording task during a video recording process, and recording a playback process of the second video, to obtain a third video.

The embodiments of the present disclosure further provides an apparatus for video editing, including: a video obtaining module configured to obtain a plurality of target videos, the plurality of target videos including a first video shot and recorded by different user users for a same recording task; a template obtaining module configured to obtain an editing template corresponding to the plurality of target videos, the editing template including display position information of the plurality of target videos and track information of the plurality of target videos; and a video editing module configured to show a video editing interface based on the plurality of target videos and the editing template; wherein the video editing interface includes a preview playback area and an editing track area, the editing track area includes a plurality of video editing tracks, images of the plurality of target videos are respectively presented in a display area in the preview playback area that is indicated by respective display position information of the plurality of target videos, and each of the plurality of target videos forms a video track segment on one of the plurality of video editing tracks based on the track information, and timeline positions of the video track segments of the plurality of target videos partially or completely overlap.

Embodiments of the present disclosure also provides an electronic device, the electronic device including: a processor; and a memory for storing processor-executable instructions; the processor is configured to read the executable instructions from the memory and executing the instructions to implement a method for video editing as provided in embodiments of the present disclosure.

Embodiments of the present disclosure also provides a computer-readable storage medium, the storage medium storing a computer program, the computer program is configured for performing a method for video editing as provided in embodiments of the present disclosure.

The above technical solution provided in the embodiments of the present disclosure obtains a plurality of target videos (including first videos shot and recorded by different user devices for a same recording task), and obtains an editing template corresponding to the plurality of target videos (including display position information of the plurality of target videos and track information of the plurality of target videos). After that, a video editing interface can be directly shown based on the plurality of target videos and the editing template. The video editing interface includes a preview playback area and an editing track area, the editing track area includes a plurality of video editing tracks, images of the plurality of target videos are respectively presented in a display area in the preview playback area that is indicated by respective display position information of the plurality of target videos, and each of the plurality of target videos forms a video track segment on one of the plurality of video editing tracks based on the track information, and timeline positions of the video track segments of the plurality of target videos partially or completely overlap. Through the above method, it is possible to conveniently and quickly edit videos recorded by a plurality of users for the same recording task, which can effectively reduce the cost of online video co-creation.

It should be understood that the contents described in this section are not intended to identify key features or important features of embodiments of the present disclosure, nor are they intended to limit the scope of the present disclosure. Other features of the present disclosure will become readily understood from the following description.

BRIEF DESCRIPTION OF THE DRAWINGS

The accompanying drawings herein are incorporated in this specification and constitute a part of this specification, which illustrate embodiments of the present disclosure. The drawings together with the description serve to explain the principles of the present disclosure.

In order to more clearly illustrate the technical solutions in the embodiments of the present disclosure or the prior art, the drawings required for describing the embodiments or the prior art will be briefly introduced below. Obviously, for those skilled in the art, other drawings can also be obtained based on these drawings without creative labor.

DETAILED DESCRIPTION

In order to better understand the above objects, features, and advantages of the present disclosure, the solutions of the present disclosure will be described in the following. It should be noted that, the embodiments of the present disclosure and the features in the embodiments can be combined with each other without conflict.

Many specific details are set forth in the following description in order to fully understand the present disclosure, but the present disclosure may also be implemented in other ways different from those described herein; obviously, the embodiments in the specification are only part of the embodiments of the present disclosure, instead of all embodiments.

The inventor found through research that the production cost of the existing method for online co-creating videos is very high. For example, if each of a plurality of users need to record online communication performance of other users, or record viewing performance of different users for the same video, each user needs to use at least two devices (such as turning on a mobile phone and a computer at the same time) to achieve simultaneous recording, screen casting, and multi-person online interaction. Moreover, a plurality of software tools need to be turned on at the same time to achieve related functions, thus it is time-consuming and laborious, besides, and what is obtained eventually is only the screen-recorded video output by the screen recording tool, which is not convenient for further editing. In addition, when each user's video is directly recorded and then a plurality of videos are integrated together, each user needs to transmit the video to a designated user after recording, and then the designated user integrates the videos of the plurality users for editing processing, which is also time-consuming and costly. To solve at least one of the above problems, embodiments of the present disclosure provide a method, an apparatus, a device and a medium for video editing, which will be described in detail below.

Figure 1:
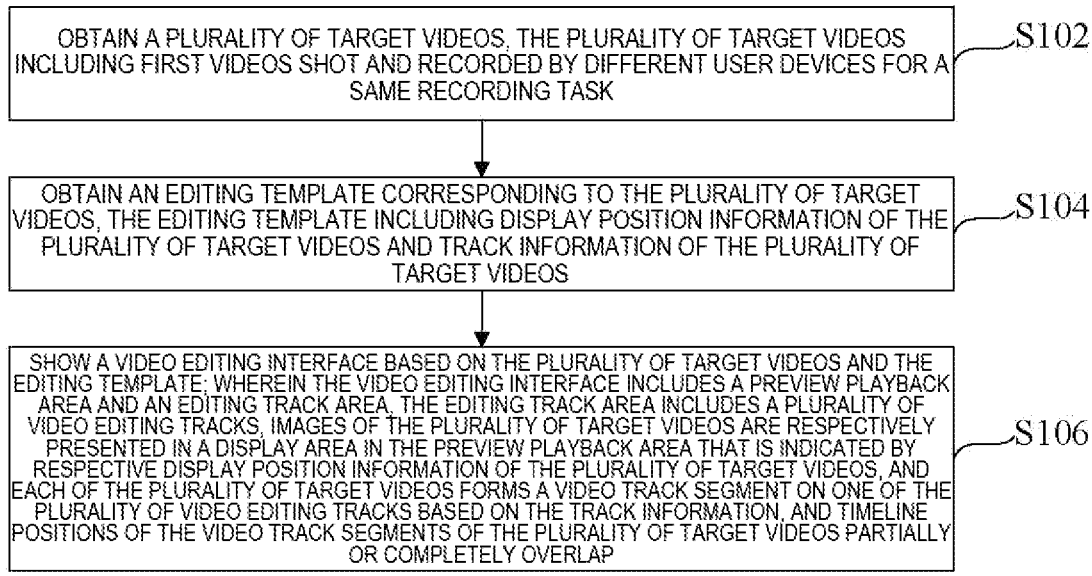
FIG. 1 is a schematic flowchart of a method for video editing provided by an embodiment of the present disclosure.

FIG. 1 is a schematic flowchart of a method for video editing provided by embodiments of the present disclosure. The method can be executed by an apparatus for video editing, which can be implemented in software and/or hardware and can generally be integrated into an electronic device. As shown in FIG. 1, the method mainly includes the following steps S102 to S106:

Step S102, obtaining a plurality of target videos, the plurality of target videos including first videos shot and recorded by different user devices for a same recording task.

For example, user devices can be mobile phones, computers, wearable devices, etc. which is not limited here. In practical applications, there may be a plurality of user devices, and each user may use only one user device. When a plurality of users perform the same recording task, they can use their respective devices to shoot and record, so as to obtain the first video corresponding to each device. The present disclosure does not limit the recording task, for example, the recording task may be shooting user performance using front-facing cameras of the user devices, such as, shooting user online interaction performance; for example, the recording task may also be using the user device to shoot a scene where the user is located, etc. The specific recording task can be flexibly set as needed, and the embodiments of the present disclosure do not make limitation on this.

It should be noted that in practical applications, the target video may not only include the first video, but also include a third video obtained based on the second video. The second video is a video played by different user devices during the shooting and recording process for the recording task, and the third video is configured to present a playback state of the second video during the shooting and recording process. That is, the target video may also include a third video obtained based on the second video played synchronously by different user devices during the shooting and recording process. The third video can present the playback state of the second video during the shooting and recording process, so as to participate in video editing together with the first videos in post-production.

For example, a plurality of users view the second video synchronously, that is, individual user devices play the second video synchronously, and at the same time, the viewing performance of each user is recorded through the front-facing camera of each of the user devices. The second video can be determined by the initiator of the recording task (also known as the main creator), such as the second video can be obtained through a second video file or a second video link uploaded by the main creator, and the second video is played synchronously for all user devices. During the playback of the second video, the playback state of the second video can also be adjusted and controlled, such as speeding up the playback progress, slowing down the video playback, reviewing videos, etc., without limitation. The third video obtained finally can be only the second video, and can be further associated with playback control information of the second video, so that the playback state of the second video can be restored based on the playback control information when the third video is played later. The third video can also be a recorded video of the second video, such as the entire playback process of the second video is recorded to obtain the third video. The specific settings can be flexibly provided as needed, which will not be limited here. Later, the third video obtained through a plurality of users viewing the second video and the first videos obtained by recording the viewing performance of each user can be synthesized to generate a video duet about a plurality of persons viewing the same video content.

In practical applications, a target user device can be set, and different user devices perform shooting and recording respectively for the same recording task to obtain first videos. Other user devices can send their respective recorded first videos to the target user device and obtain the third video through the target user device, so that the first videos and the third video are integrated on the target user device for subsequent processing. In addition, respective user devices can also upload the recorded first videos and the third video recorded through the target user device to the server for subsequent processing, which is not limited here. In some specific implementations, different user devices include the first user device and the second user device. The first user device is a device for importing the second video for the recording task. In addition, the first user device may also be a device that initiates the recording task, that is, the first user device can both initiate the recording task and import the second video for the recording task. The specific settings can be flexibly provided as needed.

In a case where the recording task is not closed and the first user device does not exit the recording task, the target user device is the first user device; and in a case where the recording task is not closed and the first user device exits the recording task, the target user device is the second user device. The second user device can be a device other than the first user device among the plurality of user devices that perform the recording task, which can be manually specified, randomly determined, or determined according to a preset method, such as, the preset method may be taking a user device invited by the first user device as the second user device. Through the above methods, the smooth execution of the recording task and video editing processing can be effectively ensured.

Step S104, obtaining an editing template corresponding to the plurality of target videos, the editing template including display position information of the plurality of target videos and track information of the plurality of target videos. The track information is information of the editing tracks of a plurality of target videos in a multi-track editor, such as type of the editing track (main track, picture-in-picture track).

In practical applications, a plurality of editing templates can be pre-set, and then the user selects a desired editing template from a plurality of preset editing templates. The selected editing template can be directly used as the editing template corresponding to the plurality of the target videos, or the user (such as the initiator of the recording task) can further adjust and modify the selected editing template as needed, thereby obtaining the editing template corresponding to the plurality of the target videos. In embodiments of the present disclosure, by obtaining the editing template, the display position and corresponding editing track of each target video can be directly determined, so that the plurality of target videos can be easily and quickly edited later.

For example, in a case where the target videos include a third video, the video editing track corresponding to the third video is the main track, and the video editing tracks corresponding to the first videos are the picture-in-picture tracks. The picture-in-picture tracks are sub-tracks. In a case where the plurality of target videos include only the first videos, a video editing track corresponding to a first video shot by a third user device in the different user device is a main track, and video editing tracks corresponding to the first videos shot by other user devices except the third user device in the plurality of target videos are picture-in-picture tracks; wherein the third user device is a device that initiates the recording task. In practical applications, the correspondence of tracks to individual target videos can also be flexibly set, such as specifying a track corresponding to each of the videos by the user, which is not limited here. In practical applications, the above-mentioned third user device can not only initiate a recording task, but can also upload a second video. The third user device and the first user device that imports the second video for the recording task may be the same user device, such as the main creator's user device. In addition, the third user device can also be different from a first user device, such as the first user device and the third user device are two devices of different users, and the two users can upload different second videos according to their needs, which is not limited here.

Step S106, showing a video editing interface based on the plurality of target videos and the editing template.

In some implementation examples, the video editing interface includes a preview playback area and an editing track area. The editing track area includes a plurality of video editing tracks, and the plurality of video editing tracks can include a main track and one or more picture-in-picture tracks (sub-tracks). The plurality of video editing tracks can be arranged from top to bottom with the main track located at the top or bottom position, which is not limited here. Each of the plurality of target videos forms a video track segment on one of the plurality of video editing tracks based on the track information, and timeline positions of the video track segments of the plurality of target videos partially or completely overlap. It can be understood that track information can indicate a track type and track position or track identifier corresponding to each target video. Based on the track information of each target video, a video editing track corresponding to each target video can be directly determined from the video editing tracks, and the target video can be used as a video track segment on the video editing track, so as to edit the video track segment constituted of the plurality of target videos. The timeline positions of the plurality of target videos overlap partially or completely. For example, assuming that the start time and end time of all users' recordings are the same, it can be regarded as that the timelines are overlap completely; or assuming that the start time and end time of some users' recordings are inconsistent with those of other users, such as the recording is ended in advance, the target video obtained accordingly may partially overlap with the timeline positions corresponding to target videos of other users. The specific settings can be flexibly provided as needed, which is not limited here.

The images of the plurality of target videos are respectively presented in a display area in the preview playback area that is indicated by respective display position information of the plurality of target videos. Specifically, for each target video, the display area of the target video in the preview playback area is determined based on the display position information of the target video. Through the above method, the display area of each image screen of the plurality of target videos presented in the preview playback area can be directly determined based on the display position information in the editing template, so that users can clearly understand the present effect of each target video through the preview playback area.

In addition, the video editing interface may also include operation controls for editing tools, which are configured to trigger video editing processing in response to a user operation. The operation controls for editing tools include a text editing control, a sticker editing control, an animation special effect control, etc., and may also include a track editing control, which is not limited here. Embodiments of the present disclosure do not limit the arrangement of the above areas in the video editing interface, such as arranging the preview playback area above the editing track area and arranging an operation control for a specified editing tool below the editing track area.

By the above method, it is possible to conveniently and quickly edit videos recorded by a plurality of users for the same recording task, which can effectively reduce the cost of online video co-creation. The apparatus that performs the above method for video editing can be a user device or a server, and can interact with other devices during the execution process, which is not limited here.

In some specific implementation examples, the method for video editing provided by embodiments of the present disclosure further includes the following steps (1) to (3) before obtaining a plurality of recorded videos:

(1) In response to receiving a request for duet from the target user device, creating the recording task and showing a user interface corresponding to the recording task on the target user device; where a video addition control and a user invitation control are displayed in the user interface. For example, the recording task can be a task of multiple persons viewing videos together, while recording the performance video of each user viewing the video and the playback of the video (the second video mentioned above) viewed simultaneously by plurality of users. Embodiments of the present disclosure do not limit the detailed implementation of creating a recording task, such as creating an online chat room for a plurality of users to enter the online chat room for online interaction and/or view the video played in the chat room, while recording the online interaction performance of each user and video playback state.

(2) In response to detecting that the video addition control is triggered, obtaining video information uploaded by the target user device, and obtaining the second video based on the video information; wherein the video information includes a local video file and/or a network video link. The second video is a video viewed jointly by a plurality of users. In practical applications, if the target video contains the second video, the target user device can be a device that simultaneously initiates the recording task and imports the second video for the recording task. In some specific implementation examples, the target user device can be equivalent to the above first user device, and the first user device can initiate recording tasks and import the second video for recording tasks.

In practical applications, users can be provided with various types of video addition controls, such as a video addition control for uploading local video files and/or a video addition control for filling network video links. Users can select a desired video addition control according to their needs. In addition, the number of second videos can be one or more, such as users can simultaneously upload a plurality of second video files and/or enter a plurality of network links for the second videos. In practical applications, the video information uploaded by users can also be parsed, such as when a user uploads a network video link, the network video link can be parsed to obtain a corresponding second video. In practical applications, if the parsing fails, a prompt can be issued to the user to modify the network video link. Furthermore, in order to ensure information security, the video information can be reviewed to avoid the second video containing illegal content or to avoid the source of the second video not meeting a preset source requirement.

(3) in response to detecting that the user invitation control is triggered, generating invitation information of the recording task for the target user device to send the invitation information to a specified user device, the invitation information being configured for prompting the specified user device to join the recording task.

Specifically, the user of the target user device (the user who initiates the recording task, which can be referred to as the main creator) may invite a designated user by triggering the user invitation control, such as when the main creator triggers the user invitation control, invitation information as an invitation password or a chat room link can be shown on the user interface, so that the main creator can forward the invitation information to other users, and these other users can directly enter the chat room created by the main creator to perform the recording task based on the invitation information.

Figure 2:
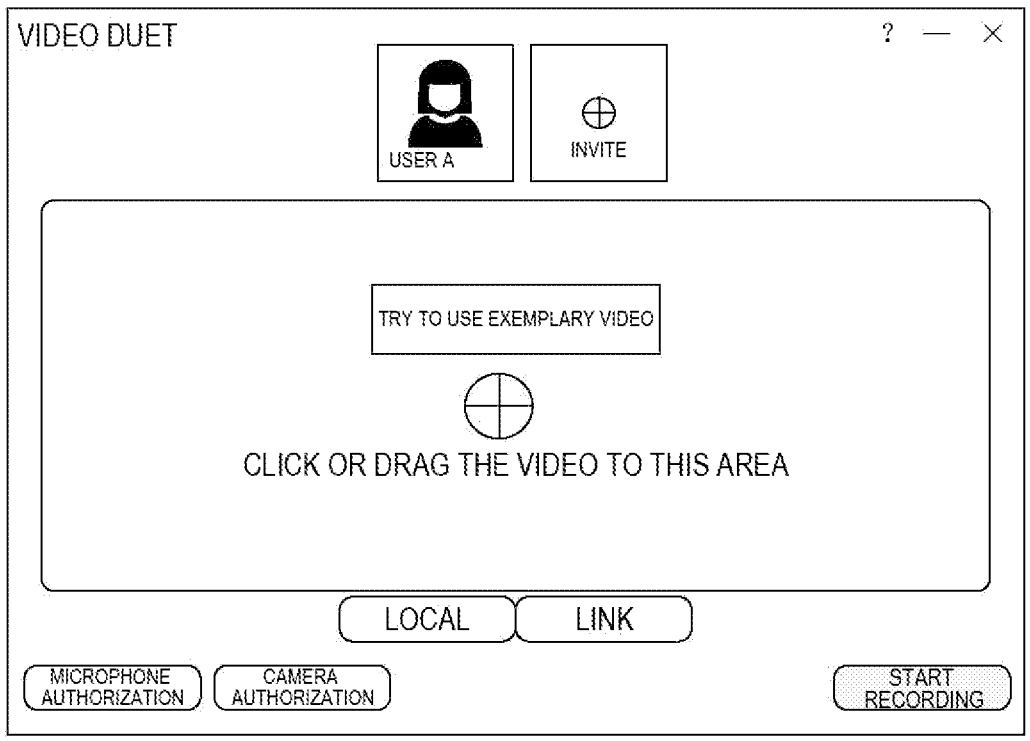
FIG. 2 is a schematic diagram illustrating a user interface provided by an embodiment of the present disclosure.

For ease of understanding, a schematic diagram of the user interface shown in FIG. 2 can be referred to, which illustrates that after the main creator initiates a request for duet through his/her target user device, the user interface corresponding to the recording task is shown on the target user device. A video addition control and a user invitation control are displayed on the user interface. Users can upload video files by triggering a local control, enter video links by triggering a link control, or directly upload video files by dragging and dropping videos. Furthermore, preset example videos can be provided for users so that they can directly take an example video as the second video for experience. In addition, FIG. 2 also illustrates a front-facing camera recording window of the main creator (user A in FIG. 2), which can be used to display real-time recording screens containing the face of the main creator. The user invitation control is located on one side of the front-facing camera recording window of the main creator. By triggering the user invitation control, the main creator can obtain invitation information and invite designated users to join the chat room based on the invitation information. At this time, the front-facing camera recording windows of users invited to enter the chat room will be displayed. The position of the user invitation control is adjusted to outside of the front-facing camera recording window of latest invited user until the number of users invited by the main creator has reached a preset number threshold; at this time, the user invitation control will no longer be displayed. It should be noted that if the main creator has neither added a video nor invited a user, a start recording control on the user interface is displayed as not being triggered, such as the control is presented as gray, and the user's trigger operation cannot be responded.

In practical applications, a first area and a second area are shown on both the user interface of the target user device and the user interfaces of other user devices performing the recording task; wherein the first area is configured to show image screens of the first videos shot and recorded by individual user devices, and the second region is configured to show an image screen of the second video. That is to say, individual users participating in the recording task may view the second video at the same time, and may also view the user performance screens recorded by the front-facing cameras of all users at the same time.

Figure 3:
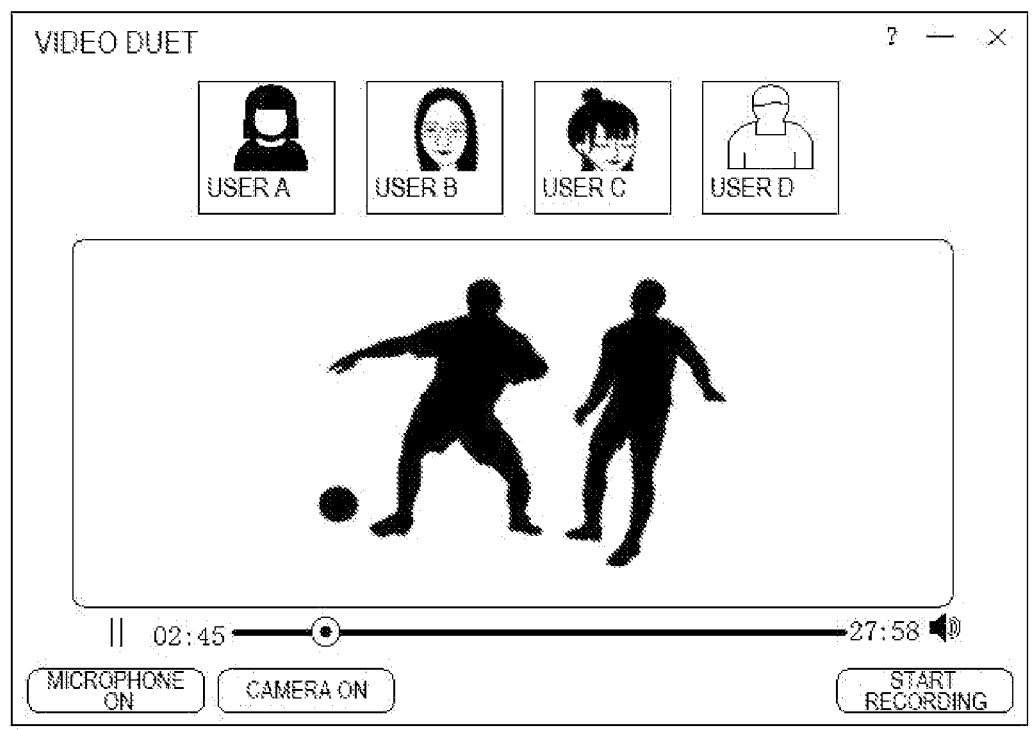
FIG. 3 is a schematic diagram illustrating a user interface provided by an embodiment of the present disclosure.

For example, a schematic diagram of the user interface shown in FIG. 3 can be referred to, which illustrates front-facing camera recording windows of a plurality of users (User A~User D) displayed on the user interface of the target user device. The image screens of reaction videos of individual users (i.e., the first videos) are shown through the recording window. In addition, a display window for the second video is also displayed on the user interface provided in FIG. 3 for showing the image screen of the second video. During this period, the main creator (assuming user A) has the playback control permission for the second video, and they may also adjust the playback state (such as progress or speed) of the second video at any time as needed. FIG. 3 shows a video of the main creator, and thus also shows to the creator a start recording control and a playback adjustment control for the second video. For users B to D and other participants, their user interfaces are basically the same as the user interface of the main user. They can also view the image screens of all users' reaction videos and the image screens of the second video, but the main difference can be that the start recording control and the playback adjustment control for the second video are no longer displayed on the user interfaces of the users B to D, that is, only the creator is provided with the control permission of the recording task. Through the above user interfaces, it can be seen that each user in the chat room can view the second video at the same time, or view each other's reactions. so as to interact online, which further realizes multi-person video duet.

As mentioned earlier, a start recording control is displayed on the user interface of the target user device, so that the user (main creator) of the target user device can trigger recording through the start recording control. In a case where the video addition control is not detected to be triggered by the target user device and the user invitation control is not detected to be triggered by the target user device, the start recording control is in a non-triggerable state; where the start recording control in the non-triggerable state is not capable of being triggered to record a video. That is, if the main creator does not upload a video or invite other users to participate, it is considered that the recording condition is not met at this time and the recording cannot be started. Therefore, the start recording control can be set to a non-triggering state, and the user cannot start the recording procedure through the start recording control.

In a case where the video addition control is detected to be triggered by the target user device and/or the user invitation control is detected to be triggered by the target user device, the start recording control is in a triggerable state; wherein the start recording control in the triggerable state is configured to start recording a video when being triggered. That is, when the main creator meets the recording condition, i.e. the main creator is allowed to start the recording procedure by issuing a recording instruction through the start recording control. In practical applications, the start recording control can be displayed on only the user interface of the target user device, and the start recording control will not be displayed on user interfaces of other user devices, that is, the control permission to start recording is only provided to the main creator.

Based on the foregoing, when obtaining a plurality of recorded videos, the following steps a and b can be referred to:

Step a, in response to detecting that the start recording control in the triggerable state is triggered, performing recording based on frame images captured by front-facing cameras of the user devices performing the recording task, to obtain the first videos. Specifically, after the start recording control is triggered, individual user devices used to perform the recording task may start recording performance videos of respective users, such as capturing video frame screens containing respective user faces through the front-facing cameras to obtain the first videos corresponding to individual user devices.

Step b, in a case where the second video is obtained by the target user device, synchronously playing the second video by the user devices performing the recording task during a video recording process, and recording a playback process of the second video, to obtain a third video. For example, individual user devices may synchronously play the second video, while the front-facing cameras record the users' performance when viewing the second video. The target user device or server may record the complete playback process of the second video, such as recording the content area of the second video, recording the pauses, playbacks, dragging of progress bar, soundtrack, etc. that appear during the playback process of the second video, and obtaining the third video.

In practical applications, different user devices include a target user device, a user interface provided by the target user device for the recording task is presented with a video operation control in a triggerable state; the video operation control may be referred to as operation control for the second video, which is configured to adjust the playback state of the second video. User interfaces provided by other user devices in the different user devices except the target user device for the recording task are not presented with the video operation controls in the triggerable state. In a case where the video operation control is in the triggerable state, in response to detecting a user triggering operation for the video operation control on the target user device, the playback state of the second video is adjusted based on the user trigger operation. That is, the operation permission for the second video can be provided to the target user device that initiates the recording task. The user of the target user device has the permission to adjust the playback state of the second video during the playback process of the second video. The playback state includes, but is not limited to, pause state, review state, fast forwarding state, slow playback state, etc.

The user of the target user device can flexibly control the playback state of the second video as needs, such as slowing down the playback speed of important content when viewing the important content in the second video, or reviewing the important content multiple times.

In specific implementation, different user devices may include a first user device and a second user device, the first user device is a device for importing the second video for the recording task; in a case where the recording task is not closed and the first user device does not exit the recording task, the target user device is the first user device; and in a case where the recording task is not closed and the first user device exits the recording task, the target user device is the second user device. In practical applications, the main creator also has a permission to end the recording, and on this basis, the user interface of the first user device further includes an end recording control; the above method further includes: in a case where the end recording control of the first user device is not detected to be triggered, if it is detected that the first user device stops executing the recording task, it indicates that the main creator may be accidentally disconnected or need to be offline midway, which specifically corresponds to the case where the above-mentioned recording task is not closed and the first user device does not exit the recording task, at this time, a substitute user device other than the target user device (i.e., the second user device mentioned above) can be determined from different user device, and a video operation control and an end recording control that can be triggered by the user are presented on the user interface shown when the substitute user device performs the recording task. For example, the recording control can be transferred to a participant designated by the main creator, or the recording control can be transferred to the first priority participant, which can be flexibly set as needed and is not limited here. That is, through the above way, when the main creator goes offline early, a substitute user can be found as anew main creator to continue to perform subsequent operations such as video playback control and end recording, so as to fully ensure that the recording task can be executed normally.

Further, in the case of obtaining a plurality of target videos through the foregoing ways, embodiments of the present disclosure also provide an implementation example of obtaining an editing template corresponding to the plurality of target video, which may be implemented with reference to the following steps A and B:

Step A, in response to receiving an editing request from a fourth user device in the different user devices, showing a template selection page. For example, the fourth user device can be a user device that initiates the recording task, or a device that uploads the second video, or a specific user device, which is not limited here. That is, the fourth user device can be the same as the first user device and/or the third user device as mentioned above. In addition, the fourth user device can also be another specified device in the plurality of user devices, which are not limited here. In other words, in the embodiments of the present disclosure, the device that initiates the recording task, the device that imports the second video, and the device that executes video editing can be the same device or different devices, which may be flexibly set as needed. The template selection page includes a plurality of video layout effect diagrams, and the video layout effect diagram includes a plurality of areas, each area in the plurality of areas corresponds to a video display position and a video editing track. That is, the window display area of each target video can be displayed in the video layout effect diagrams to present the relative positional relationship between individual target videos. The display positions of the target video in different video layout effect diagrams are different. In embodiments of the present disclosure, the video editing tracks corresponding to individual areas may also be preset, and instead of intentionally setting the video tracks by users, the display position and video editing track corresponding to each target video can be automatically determined by selecting a video layout effect diagram, which is conductive to further improving the efficiency of video editing.

Step B, in response to detecting a selection operation for a target effect diagram in the plurality of video layout effect diagrams, determining the editing template corresponding to the plurality of target videos based on an editing template corresponding to the target effect diagram.

The video layout effect diagram can intuitively present the display positions of individual videos on the interface and the relative position relationships between different videos. Therefore, users can easily and quickly select a desired target effect diagram from the plurality of video layout effect diagrams. Each video layout effect diagram corresponds to an editing template. After the user selects the target effect diagram, the editing template corresponding to the target effect diagram can be directly used as the editing template corresponding to plurality of target videos. Users can further perform personalized adjustment on the editing template of the target effect diagram as needed, and use the adjusted template as the editing template corresponding to plurality of target videos.

In some implementation examples, the following steps B1 to B2 can be referred to:

Step B1, showing a layout preview image of a plurality of target videos based on the target effect diagram selected by the target user from the plurality of video layout effect diagrams and the plurality of target videos.

Figure 4:
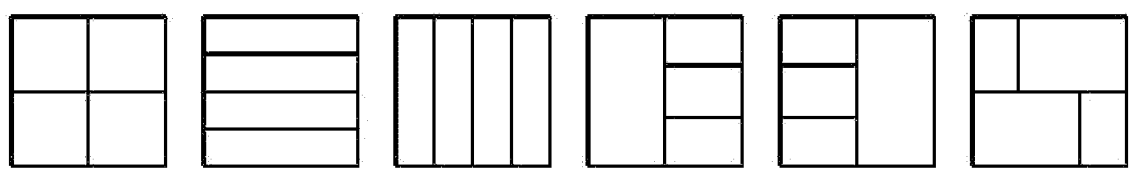
FIG. 4 is a schematic diagram illustrating various layout effects provided by the present disclosure.

For ease of understanding, various layout effect diagrams shown in FIG. 4 can be referred to. Specifically, six types of video layout effects are simply illustrated, each of which shows the display areas and relative position relationship between different target videos. Users can select a desired target effect diagram according to their needs, and a layout preview image of the plurality of target videos can be generated easily and quickly based on the video display positions indicated by the target effect diagram and the plurality of target videos, to clearly and intuitively present the showing effect of the plurality of target videos in the subsequent stage of jointly editing the video. In addition, users can also adjust the proportion of individual video display areas indicated by each video layout effect according to their needs while ensuring that the relative position relationships between individual video display areas remain unchanged. Alternatively, users can further adjust the relative position relationships between individual video display areas based on the selected target effect diagram, so as to perform personalized settings, which is not limited here.

Step B2, based on the adjustment operation of the target user for the display positions of the target videos in the layout preview image, determining an editing template corresponding a plurality of target video.

In specific implementation, each video layout effect diagram corresponds to an initial editing template. Firstly, a layout preview image of the plurality of target videos can be generated based on the target effect diagram selected by the target user, the initial editing template corresponding to the target effect diagram, and the plurality of target videos. The display positions of individual target videos in the layout preview image are determined based on the display position information of the individual target videos indicated by the initial editing template corresponding to the target effect diagram. Based on the adjustment operation of the target user for the display positions of the target videos in the layout preview image, the display position information of the initial editing template corresponding to the target effect diagram is adjusted to obtain the target editing template. The target editing template is an editing template corresponding to the plurality of target videos mentioned above. The main difference between the target editing template and the initial editing template corresponding to the target effect diagram is that the display positions of the target video adjusted by the user are different in the two editing templates.

Embodiments of the present disclosure also provides an operation mode for the user to adjust the display positions of the target videos, for example, the user may adjust the display positions of the target videos by dragging the floating windows of the target videos, and further, the horizontal layout and vertical layout can be preset. If the floating windows of one or more target video are dragged to a first designated area, the horizontal layout is displayed for the user. For example, a plurality of first videos are arranged horizontally above the third video. If one or more floating windows are dragged to a second designated area, the vertical layout is displayed for the user. For example, a plurality of first videos are arranged vertically on a side of the third video. Through the above method, the layout of the plurality of target videos can be easily and quickly adjusted to quickly determine the editing template corresponding to the plurality of target videos.

After determining the editing template corresponding to the plurality of target videos (i.e. the above-mentioned target editing template), the target videos are imported into the target editing template to generate a video editing draft. The video editing draft can be regarded as an engineering file, including material such as videos and editing operation information for the material. Then, the video editing draft can be imported into the multi-track editor. In other words, the editing draft presented in the multi-track editor is obtained by importing the target videos into the target editing template. This presents a video editing interface to users for directly editing the plurality of target videos through the video editing interface, generating the edited fourth video finally, which can also be called a video duet or video co-creation.

Figure 5:
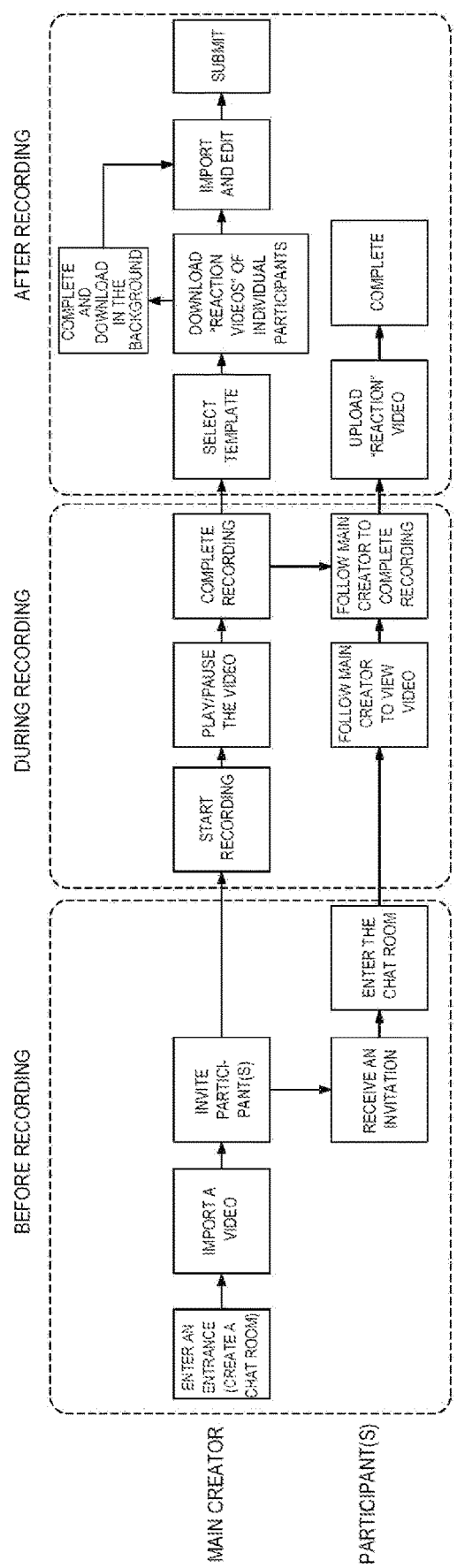
FIG. 5 is a flowchart of a method for video editing provided by an embodiment of the present disclosure.

Through the above method, the editing cost of online co-creation videos is fully saved. The plurality of users can be unconstrained by geographical locations, and each only needs to use one device and open one software application that can execute the method for video editing provided by the embodiments of the present disclosure, to conveniently and quickly achieve the purpose of video co-creation. For ease of understanding, the embodiments of the present disclosure also show a flowchart of a method for video editing in FIG. 5, which respectively illustrates operation processes of the main creator (corresponding to the target user device that initiates the recording task) and participants (corresponding to the invited user devices) before, during, and after recording. Before recording, the main creator may trigger to create a chat room through an entrance to video duet, and import on the chat room interface a video (the second video mentioned above) that all users need to view together when executing the recording task, and then invite the participants by triggering the user invitation control, etc. After receiving the invitation, the participants can directly enter the chat room based on the invitation information. During the recording process, the main creator has the permissions to start recording, play/pause the video that is viewed together, and confirm the completion of the recording. The participants only need to follow the main creator to view the video and follow the main creator to complete the recording. After recording, the main creator may choose a template and download the reaction videos of the participants (i.e. the performance videos of the participants viewing the video recorded by the devices of the participants). For the participants, they only need to upload the reaction video directly. The main creator may download videos of individual participants in the background, import all recorded videos obtained into the multi-track editor for editing, and finally submit the final video obtained by editing. Through the above method, online video co-creation can be easily and quickly realized, which greatly saves the cost in co-creating videos by a plurality of persons and effectively improves user experience.

Figure 6:
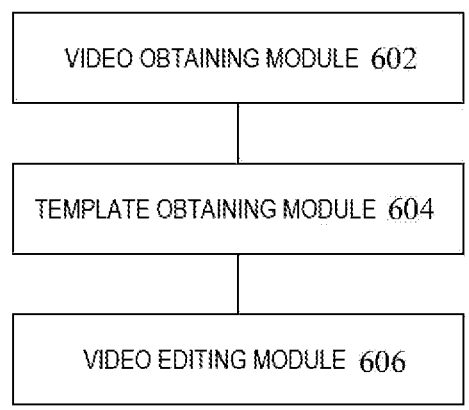
FIG. 6 is a structural schematic diagram illustrating an apparatus for video editing provided by an embodiment of the present disclosure.

Corresponding to the method for video editing, FIG. 6 is a structural schematic diagram of an apparatus for video editing according to embodiments of the present disclosure, the apparatus may be implemented by software and/or hardware, generally integrated in an electronic device. As shown in FIG. 6, the apparatus for video editing includes:

- a video obtaining module 602 configured to obtain a plurality of target videos, the plurality of target videos including a first video shot and recorded by different user users for a same recording task;
- a template obtaining module 604 configured to obtain an editing template corresponding to the plurality of target videos, the editing template including display position information of the plurality of target videos and track information of the plurality of target videos;
- a video editing module 606 configured to show a video editing interface based on the plurality of target videos and the editing template; wherein the video editing interface includes a preview playback area and an editing track area, the editing track area includes a plurality of video editing tracks, images of the plurality of target videos are respectively presented in a display area in the preview playback area that is indicated by respective display position information of the plurality of target videos, and each of the plurality of target videos forms a video track segment on one of the plurality of video editing tracks based on the track information, and timeline positions of the video track segments of the plurality of target videos partially or completely overlap.

With the above apparatus, it is possible to conveniently and quickly edit videos recorded by a plurality of users, which can effectively reduce the cost in online video co-creation.

In some embodiments, the target video further includes a third video obtained based on a second video, the second video is a video played by the different user devices during a shooting and recording process for the recording task, and the third video is configured to present a playback state of the second video during the shooting and recording process.

In some embodiments, the different user devices include a target user device; a user interface provided by the target user device for the recording task is presented with a video operation control in a triggerable state; and user interfaces provided by other user devices in the different user devices except the target user device for the recording task are not presented with the video operation control in the triggerable state; and in a case where the video operation control is in the triggerable state, in response to detecting a user triggering operation for the video operation control on the target user device, the playback state of the second video is adjusted based on the user trigger operation.

In some embodiments, the different user devices include a first user device and a second user device, and the first user device is a device for importing the second video for the recording task; in a case where the recording task is not closed and the first user device does not exit the recording task, the target user device is the first user device; and in a case where the recording task is not closed and the first user device exits the recording task, the target user device is the second user device.

In some embodiments, the video editing track corresponding to the third video is a main track, and the video editing tracks corresponding to the first videos are picture-in-picture tracks.

In some embodiments, in a case where the plurality of target videos include only the first videos, a video editing track corresponding to a first video shot by a third user device in the different user device is a main track, and video editing tracks corresponding to the first videos shot by other user devices except the third user device in the plurality of target videos are picture-in-picture tracks; where the third user device is a device that initiates the recording task.

In some embodiments, the template obtaining module 604 is specifically configured to: in response to receiving an editing request from a fourth user device in the different user devices, show a template selection page; wherein the template selection page includes a plurality of video layout effect diagrams, the video layout effect diagrams include a plurality of areas, and each area in the plurality of areas corresponds to a video display position and a video editing track; and in response to detecting a selection operation for a target effect diagram in the plurality of video layout effect diagrams, determine the editing template corresponding to the plurality of target videos based on an editing template corresponding to the target effect diagram.

In some embodiments, the template obtaining module 604 is specifically configured to: show a layout preview image of the plurality of target videos based on the target effect diagram selected by the target user from the plurality of video layout effect diagrams and the plurality of target videos; and determine the editing template corresponding to the plurality of target video based on an adjustment operation of the target user for a display position of the target video in the layout preview image.

In some embodiments, the above apparatus further includes:

- a task creation module configured to, in response to receiving a request for duet from the target user device, create the recording task and show a user interface corresponding to the recording task on the target user device; wherein a video addition control and a user invitation control are displayed in the user interface;
- a second video obtaining module configured to, in response to detecting that the video addition control is triggered, obtain video information uploaded by the target user device, and obtain the second video based on the video information; wherein the video information includes a local video file and/or a network video link;
- a task invitation module configured to, in response to detecting that the user invitation control is triggered, generate invitation information of the recording task for the target user device to send the invitation information to a specified user device, the invitation information being configured for prompting the specified user device to join the recording task.

In some embodiments, a first area and a second area are shown on both the user interface of the target user device and the user interfaces of other user devices performing the recording task; wherein the first area is configured to show image screens of the first videos shot and recorded by individual user devices, and the second region is configured to show an image screen of the second video.

In some embodiments, a start recording control is further displayed on the user interface of the target user device; in a case where the video addition control is not detected to be triggered by the target user device and the user invitation control is not detected to be triggered by the target user device, the start recording control is in a non-triggerable state; wherein the start recording control in the non-triggerable state is not capable of being triggered to record a video; in a case where the video addition control is detected to be triggered by the target user device and/or the user invitation control is detected to be triggered by the target user device, the start recording control is in a triggerable state; wherein the start recording control in the triggerable state is configured to start recording a video when being triggered.

In some embodiments, the video obtaining module 602 is specifically configured to: in response to detecting that the start recording control in the triggerable state is triggered, perform recording based on frame images captured by front-facing cameras of the user devices performing the recording task, to obtain the first videos; and in a case where the second video is obtained by the target user device, synchronously play the second video by the user devices performing the recording task during a video recording process, and record a playback process of the second video, to obtain a third video.

The apparatus for video editing provided by embodiments of the present disclosure may perform the method for video editing provided by any embodiment of the present disclosure, which includes the corresponding functional modules for implementing the method and beneficial effects.

Those skilled in the art will clearly understand that, for convenience and brevity of description, the specific working process of the apparatus embodiment described above, the corresponding process in the method embodiment can be referred to, which will not be repeated here.

Embodiments of the present disclosure further provides an electronic device, the electronic device including: a processor; a memory for storing processor-executable instructions; the processor is configured for reading executable instructions from the memory, and executing instructions to implement the method for video editing.

Figure 7:
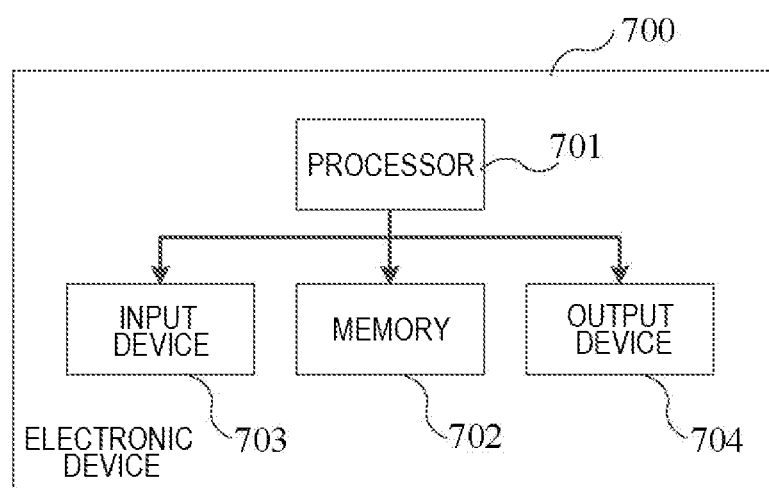
FIG. 7 is a structural schematic diagram illustrating an electronic device provided by an embodiment of the present disclosure.

FIG. 7 is a structural schematic diagram of an electronic device provided by embodiments of the present disclosure. As shown in FIG. 7, the electronic device 700 includes one or more processors 701 and a memory 702.

The processor 701 can be a central processing unit (CPU) or other form of processing unit with data processing capabilities and/or instruction execution capabilities, and can control other components in electronic device 700 to perform desired functions.

The memory 702 may include one or more computer program products, which may include various forms of computer-readable storage media, such as volatile memory and/or nonvolatile memory. The volatile memory may include random access memory (RAM) and/or cache memory, etc. The nonvolatile memory may include read-only memory (ROM), hard disk, flash memory, etc. One or more computer program instructions may be stored on the computer-readable storage medium, and the processor 701 may execute the program instructions to implement the method for video editing described in the embodiments of the present disclosure and/or other desired functions. Various contents such as input signals, signal components, noise components, etc. may also be stored in the computer-readable storage medium.

In one example, the electronic device 700 may further include: an input device 703 and an output device 704, these components are interconnected by a bus system and/or other forms of connection mechanisms (not shown).

In addition, the input device 703 may also include, for example, a keyboard, a mouse, and the like.

The output device 704 may output various information to the outside, including determined distance information, direction information, etc. The output device 704 may include, for example, a display, a speaker, a printer, and a communication network and a remote output device connected thereto.

Of course, for simplicity, only some of the components in the electronic device 700 related to this disclosure are shown in FIG. 7, and components such as buses, input/output interfaces, etc. are omitted. In addition, depending on the specific application, the electronic device 700 may also include any other suitable components.

In addition to the above methods and apparatus, embodiments of the present disclosure may also provide a computer program product including computer program instructions, the computer program instructions cause the processor to perform the method for video editing provided by the embodiments of the present disclosure, when executed by the processor.

Computer program codes for performing the operations of the present disclosure may be written in one or more programming languages or a combination thereof, including but not limited to Object Oriented programming languages-such as Java, Smalltalk, C++, and also conventional procedural programming languages-such as "C" or similar programming languages. The program code may be executed entirely on the user's computer, partially executed on the user's computer, executed as a standalone software package, partially executed on the user's computer and partially on a remote computer, or entirely on a remote computer or server.

Further, embodiments of the present disclosure may also be a computer-readable storage medium having computer program instructions stored thereon, the computer program instructions cause the processor to perform the method for video editing provided in embodiments of the present disclosure, when executed by the processor method.

The computer-readable storage medium can be implemented by any combination of one or more readable media. The readable medium can be a readable signal medium or a readable storage medium. The readable storage medium can include, but is not limited to, electrical, magnetic, optical, electromagnetic, infrared, or semiconductor systems, apparatus, devices, or any combination thereof. More specific examples of readable storage media (non-exhaustive list) include: electrical connections with one or more wires, portable disks, hard disks, random access memory (RAM), read-only memory (ROM), erasable programmable read-only memory (EPROM or flash memory), optical fibers, portable compact disc read-only memory (CD-ROM), optical storage devices, magnetic storage devices, or any suitable combination thereof.

Embodiments of the present disclosure also provides a computer program product, including a computer program/instructions, the computer program/instructions implement a method for video editing provided by embodiments of the present disclosure, when executed by a processor.

It should be noted that in the present disclosure, relational terms such as "first" and "second" are only used to distinguish one entity or operation from another entity or operation, which do not necessarily require or imply any actual relationship or order between these entities or operations. Moreover, the terms "including", "comprising", or any other variant thereof are intended to cover non-exclusive inclusion, so that a process, method, object, or device that includes a series of elements not only includes those elements, but also includes other elements not explicitly listed, or includes elements inherent to such a process, method, object, or device. In the absence of further limitations, the element defined by the sentence "comprising a . . . " does not exclude the existence of additional identical elements in the process, method, object, or device that includes the element.

The above is only a detailed description of the present disclosure, which enables those skilled in the art to understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to these embodiments described herein, but will conform to the widest scope in consistent with the principles and novel features disclosed herein.

We claim:

1. A method for video editing, comprising:
   obtaining a plurality of target videos, the plurality of target videos comprising first videos shot and recorded by different user devices for a same recording task;
   obtaining an editing template corresponding to the plurality of target videos, the editing template comprising display position information of the plurality of target videos and track information of the plurality of target videos, wherein the obtaining the editing template corresponding to the plurality of target videos comprises:
      in response to receiving an editing request from one of the different user devices, displaying a template selection page that comprises a plurality of video layout effect diagrams, wherein each video layout effect diagram comprises a plurality of areas, and each of the plurality of areas corresponds to a video display position and a video editing track, and
      in response to detecting a selection of a target effect diagram from the plurality of video layout effect diagrams, determining the editing template corresponding to the plurality of target videos based on an editing template corresponding to the target effect diagram; and
   showing a video editing interface based on the plurality of target videos and the editing template, wherein the video editing interface comprises a preview playback area and an editing track area, the editing track area comprises a plurality of video editing tracks, images of the plurality of target videos are respectively presented in a display area in the preview playback area that is indicated by respective display position information of the plurality of target videos, and each of the plurality of target videos forms a video track segment on one of the plurality of video editing tracks based on the track information, and timeline positions of the video track segments of the plurality of target videos partially or completely overlap.

2. The method of claim 1, wherein the target video further comprises a third video obtained based on a second video, the second video is a video played by the different user devices during a shooting and recording process for the recording task, and the third video is configured to present a playback state of the second video during the shooting and recording process.

3. The method of claim 2, wherein the different user devices comprise a target user device; a user interface provided by the target user device for the recording task is presented with a video operation control in a triggerable state; and user interfaces provided by other user devices in the different user devices except the target user device for the recording task are not presented with the video operation control in the triggerable state; and
   in a case where the video operation control is in the triggerable state, adjusting, in response to detecting a user triggering operation for the video operation control on the target user device, the playback state of the second video based on the user trigger operation.

4. The method of claim 3, wherein the different user devices comprise a first user device and a second user device, and the first user device is a device for importing the second video for the recording task;
   in a case where the recording task is not closed and the first user device does not exit the recording task, the target user device is the first user device; and
   in a case where the recording task is not closed and the first user device exits the recording task, the target user device is the second user device.

5. The method of claim 2, wherein the video editing track corresponding to the third video is a main track, and the video editing tracks corresponding to the first videos are picture-in-picture tracks.

6. The method of claim 2, wherein the method further comprises: before obtaining a plurality of recorded videos,
   in response to receiving a request for duet from the target user device, creating the recording task and showing a user interface corresponding to the recording task on the target user device; wherein a video addition control and a user invitation control are displayed in the user interface;
   in response to detecting that the video addition control is triggered, obtaining video information uploaded by the target user device, and obtaining the second video based on the video information; wherein the video information comprises a local video file and/or a network video link; and
   in response to detecting that the user invitation control is triggered, generating invitation information of the recording task for the target user device to send the invitation information to a specified user device, the invitation information being configured for prompting the specified user device to join the recording task.

7. The method of claim 6, wherein a first area and a second area are shown on both the user interface of the target user device and the user interfaces of other user devices performing the recording task; wherein the first area is configured to show image screens of the first videos shot and recorded by individual user devices, and the second region is configured to show an image screen of the second video.

8. The method of claim 6, wherein a start recording control is further displayed on the user interface of the target user device;
   in a case where the video addition control is not detected to be triggered by the target user device and the user invitation control is not detected to be triggered by the target user device, the start recording control is in a non-triggerable state; wherein the start recording control in the non-triggerable state is not capable of being triggered to record a video; and in a case where the video addition control is detected to be triggered by the target user device and/or the user invitation control is detected to be triggered by the target user device, the start recording control is in a triggerable state; wherein the start recording control in the triggerable state is configured to start recording a video when being triggered.

9. The method of claim 8, wherein obtaining the plurality of recorded videos comprises:

in response to detecting that the start recording control in the triggerable state is triggered, performing recording based on frame images captured by front-facing cameras of the user devices performing the recording task, to obtain the first videos;

in a case where the second video is obtained by the target user device, synchronously playing the second video by the user devices performing the recording task during a video recording process, and recording a playback process of the second video, to obtain a third video.

10. The method of claim 1, wherein in a case where the plurality of target videos comprise only the first videos, a video editing track corresponding to a first video shot by a third user device in the different user device is a main track, and video editing tracks corresponding to the first videos shot by other user devices except the third user device in the plurality of target videos are picture-in-picture tracks; wherein the third user device is a device that initiates the recording task.

11. The method of claim 1, wherein the determining the editing template corresponding to the plurality of target videos based on the editing template corresponding to the target effect diagram comprises:

showing a layout preview image of the plurality of target videos based on the target effect diagram and the plurality of target videos; and determining the editing template corresponding to the plurality of target video based on an operation of adjusting a display position of a target video in the layout preview image.

12. An electronic device, wherein the electronic device comprises:

a processor; and a memory for storing processor-executable instructions; the processor is configured to read the instructions from the memory and execute the instructions to perform operations comprising:

obtaining a plurality of target videos, the plurality of target videos comprising first videos shot and recorded by different user devices for a same recording task;

obtaining an editing template corresponding to the plurality of target videos, the editing template comprising display position information of the plurality of target videos and track information of the plurality of target videos, wherein the obtaining the editing template corresponding to the plurality of target videos comprises:

in response to receiving an editing request from one of the different user devices, displaying a template selection page that comprises a plurality of video layout effect diagrams, wherein each video layout effect diagram comprises a plurality of areas, and each of the plurality of areas corresponds to a video display position and a video editing track, and in response to detecting a selection of a target effect diagram from the plurality of video layout effect diagrams, determining the editing template corresponding to the plurality of target videos based on an editing template corresponding to the target effect diagram; and showing a video editing interface based on the plurality of target videos and the editing template, wherein the video editing interface comprises a preview playback area and an editing track area, the editing track area comprises a plurality of video editing tracks, images of the plurality of target videos are respectively presented in a display area in the preview playback area that is indicated by respective display position information of the plurality of target videos, and each of the plurality of target videos forms a video track segment on one of the plurality of video editing tracks based on the track information, and timeline positions of the video track segments of the plurality of target videos partially or completely overlap.

13. The electronic device of claim 12, wherein the target video further comprises a third video obtained based on a second video, the second video is a video played by the different user devices during a shooting and recording process for the recording task, and the third video is configured to present a playback state of the second video during the shooting and recording process.

14. The electronic device of claim 12, wherein in a case where the plurality of target videos comprise only the first videos, a video editing track corresponding to a first video shot by a third user device in the different user device is a main track, and video editing tracks corresponding to the first videos shot by other user devices except the third user device in the plurality of target videos are picture-in-picture tracks; wherein the third user device is a device that initiates the recording task.

15. A non-transitory computer-readable storage medium, wherein the storage medium stores a computer program that upon execution by a processor causes the processor to perform operations comprising:

obtaining a plurality of target videos, the plurality of target videos comprising first videos shot and recorded by different user devices for a same recording task;

obtaining an editing template corresponding to the plurality of target videos, the editing template comprising display position information of the plurality of target videos and track information of the plurality of target videos, wherein the obtaining the editing template corresponding to the plurality of target videos comprises:

in response to receiving an editing request from one of the different user devices, displaying a template selection page that comprises a plurality of video layout effect diagrams, wherein each video layout effect diagram comprises a plurality of areas, and each of the plurality of areas corresponds to a video display position and a video editing track, and in response to detecting a selection of a target effect diagram from the plurality of video layout effect diagrams, determining the editing template corresponding to the plurality of target videos based on an editing template corresponding to the target effect diagram; and showing a video editing interface based on the plurality of target videos and the editing template, wherein the video editing interface comprises a preview playback area and an editing track area, the editing track area comprises a plurality of video editing tracks, images of the plurality of target videos are respectively presented in a display area in the preview playback area that is indicated by respective display position information of the plurality of target videos, and each of the plurality of target videos forms a video track segment on one of the plurality of video editing tracks based on the track information, and timeline positions of the video track segments of the plurality of target videos partially or completely overlap.

16. The non-transitory computer-readable storage medium of claim 15, wherein the target video further comprises a third video obtained based on a second video, the second video is a video played by the different user devices during a shooting and recording process for the recording task, and the third video is configured to present a playback state of the second video during the shooting and recording process.

17. The non-transitory computer-readable storage medium of claim 15, wherein in a case where the plurality of target videos comprise only the first videos, a video editing track corresponding to a first video shot by a third user device in the different user device is a main track, and video editing tracks corresponding to the first videos shot by other user devices except the third user device in the plurality of target videos are picture-in-picture tracks; wherein the third user device is a device that initiates the recording task.

* * * * *